Nov. 24, 1959 G. K. MURPHY 2,914,001
HIGH CAPACITY PRIVATE COMPARTMENT PASSENGER VEHICLE
Filed Oct. 13, 1955 6 Sheets-Sheet 1

INVENTOR
Goodrich K. Murphy.

BY
Wm. R. Glisson
ATTORNEY

Nov. 24, 1959  G. K. MURPHY  2,914,001
HIGH CAPACITY PRIVATE COMPARTMENT PASSENGER VEHICLE
Filed Oct. 13, 1955  6 Sheets-Sheet 2

INVENTOR
BY Goodrich K. Murphy
Wm. R. Glisson
ATTORNEY

INVENTOR
Goodrich K. Murphy

BY Wm. R. Glisson
ATTORNEY

Nov. 24, 1959 G. K. MURPHY 2,914,001
HIGH CAPACITY PRIVATE COMPARTMENT PASSENGER VEHICLE
Filed Oct. 13, 1955 6 Sheets-Sheet 5

INVENTOR
Goodrich K. Murphy
BY
ATTORNEY

United States Patent Office 2,914,001
Patented Nov. 24, 1959

2,914,001
HIGH CAPACITY PRIVATE COMPARTMENT PASSENGER VEHICLE

Goodrich K. Murphy, New Canaan, Conn., assignor to The Budd Company, Philadelphia, Pa., a corporation of Pennsylvania Application October 13, 1955, Serial No. 540,300

8 Claims. (Cl. 105—315)

This invention relates to high capacity private compartment passenger vehicles which provide sitting, standing, sleeping and toilet facilities for each compartment and has for an object the provision of improvements in this art. The present invention is an improvement upon the arrangements disclosed in my co-pending application, Serial No. 343,870, filed March 23, 1953, now Patent No. 2,808,787, issued October 8, 1957, and my Patent No. 2,583,960, issued January 29, 1952.

In my patent and prior application I have disclosed high car-capacity passenger accommodations which provide sitting, standing, sleeping and toilet accommodations in a compartment space which is less than reclining width, being about twice sitting width; which is in part of standing height and in part of less than standing height; and which is in part of reclining length and in part of less than reclining length. When passenger size is referred to herein it means the size of a normal adult of about six feet height and average proportions, this being the size for which most passenger accommodations are designed. Double sitting width corresponds to the space in a normal railway passenger car between a center aisle wall and a side wall.

In the patents the compartments include bed-space alcoves which project as boots into the adjacent space, the boots being arranged in horizontally staggered disposition. This arrangement has the advantage that all compartment floors are on a common level coinciding with the center aisle floor but the disadvantage that in some rooms the bed in use position is located between the standing space and the aisle.

In the pending application the boots are arranged in vertically staggered disposition. This has the advantage that in every compartment the bed space is located at the outer wall, leaving free access between the bed and aisle. Some rooms have a floor level above the aisle floor level but the step height is small and not inconvenient.

In the arrangement disclosed in the pending application the beds are on two levels and all of the rooms are for single sleeping occupancy.

The accommodations provided by the present invention are similar to those of the copending application but the rooms are arranged in basic groups of three instead of two and on three bed levels instead of two. One of the three rooms is for double occupancy, and this provides a desirable type of accommodation which was not easily obtained in a car employing a basic two-room group unit. As a consequence, with somewhat roomier accommodations in each compartment, the present arrangement provides equal or greater total passenger capacity as compared to the arrangement of the copending application.

Moreover, while the bed of one of the two single rooms of the prior arrangement was at greater than sitting height from the floor, the present arrangement provides one bed in each room at sitting height with only the upper bed of the double room being located at greater than sitting height and here convenient means are provided for access to the upper bed without requiring a ladder.

Accordingly, it is one of the objects of the present invention to provide a room group unit in which one seat of each compartment, or at least in two of the three compartments, is located at the outer wall or window side and faced in a common direction longitudinally of the car.

Another object is to provide toilets located alongside the bed space and available for use at all times.

Another object is to provide standing space in the compartment alongside the bed when in its use position and to provide standing space in the bed zone when the bed is stowed.

Another object is to provide beds formed partly of fixed parts and partly of hinged parts which together form a full-length bed.

Another object is to provide beds in a vertical longitudinal zone at the outer wall with a toilet and standing space at the aisle side alongside the bed zone.

Another object is to provide a room group in which one bed in each room is located approximately at sitting height above the floor.

Another object is to provide convenient leg rests for the seats.

Another object is to provide in a compartment adequate space and support for an infant's crib or hammock of the type disclosed in my copending application, Serial No. 379,134, filed September 9, 1953, now abandoned, the hammock location being such that it will not interfere with the movements of the main bed parts or with sitting in the compartment.

Another object is to provide for each bed a closed storage compartment for bedding such as blankets, pillows, sheets and the like.

Another object is to provide adequate baggage space for each compartment.

Another object is to provide a wardrobe or toilet enclosure for a compartment.

Another object is to place all of the toilets and basins on the aisle side where they are convenient for piping and less subject to freezing.

The above and other objects and various novel features of the invention will be apparent from the following description of certain exemplary embodiments of the invention, reference being made to the accompanying drawings thereof, wherein.

Figure 1:
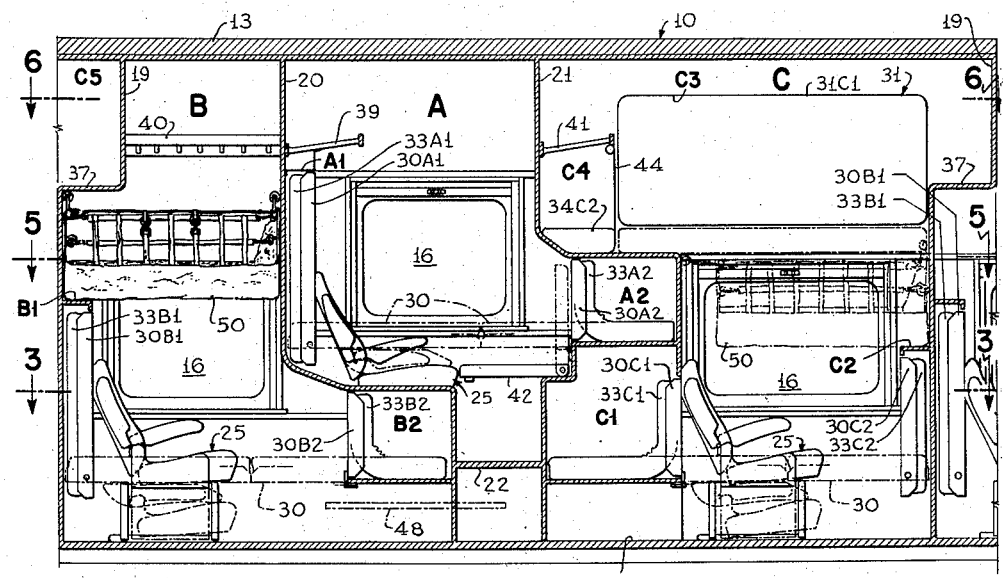
Fig. 1 is a vertical longitudinal section through a car equipped with the present accommodations, the section being taken inside the aisle wall on the line 1—1 of Figs. 3, 4, 5 and 6.

In the first embodiment, shown in Figs. 1 to 6, a railway car 10 has longitudinal outer side walls 11, a floor 12, a roof 13, a center aisle 14, aisle walls 15, windows 16 and an aisle ceiling 17. Between the aisle wall 15 and the side wall 11 on each side there are provided a plurality of transverse partition walls 19, 20 and 21 dividing the space into a plurality of separate passenger compartments A, B and C constituting a group unit which can be repeated indefinitely. For example, a standard 85 foot railway car will taken ten such units, five on each side, which furnish twenty singles and ten doubles to accommodate forty passengers in a car. In such a car there can also be a general toilet, an electric locker, two linen lockers, vestibule etc.

The three compartments of a group unit include a single-occupancy lower B, a single-occupancy upper A, and a double-occupancy lower C. The floor 22 of the upper compartment A is disposed above the aisle floor level.

In each compartment there is arranged a folding seat 25, a toilet 26, a folding wash basin 27, a wall mirror 28 and a bed 30. The bed elements of the different rooms are somewhat different so they will be designated by a suffix A, B or C, to show which room they serve. However, it is to be noted that in this particular embodiment the bed parts of rooms A and B are substantially alike.

In room A there is a folding head end bed frame 30A1 which folds up in an alcove A1 behind the folding seat back and a folding foot end bed part 30A2 which folds up to cover the front opening of a bedding alcove A2. The mattress parts are designated 33A1 and 33A2.

In room B there is a folding head end bed frame part 30B1 in an alcove B1 and a folding foot end bed part 30B2 in an alcove B2. The mattress parts are designated as 33B1 and 33B2.

In room C there is a lower bed comprising a folding head end frame part 30C1 in an alcove C1 and a folding foot end frame part 30C2 in an alcove C2. The bed mattress parts are designated as 33C1 and 33C2.

In room C there is also an upper bed 31 comprising and edge-hinged frame part 31C1 with a mattress part 34C1 stowable in a side wall and ceiling recess C3 and a fixed bed mattress part 34C2 secured on the bottom of an alcove C4. This bed could be made in a single length by omitting a bag rack.

It will be noted that all of the beds are located in a vertical longitudinal zone at the outer wall, that the outer seats in the bed zone are all facing in the same direction and that the toilets and washbasins are all located clear of the bed zone and adjacent the aisle wall. In the single rooms A and B the toilets are located diagonally opposite the seats and in double room C the toilet is located at one side of and well behind the main or window seat of the room. In the C room there is a second seat 25C2 located on the asile side in front of the toilet. The upper part of the back rest of the seat is foldable to form a step 32, and the cushion folds up to provide easier passage to the outer seat.

The wall 19 between the room C and the room B (of another group) is plane in the lower part behind the bed alcove B1 but is provided with a recess or alcove C5 across the top to form a baggage rack 37 for room C.

Figure 2:
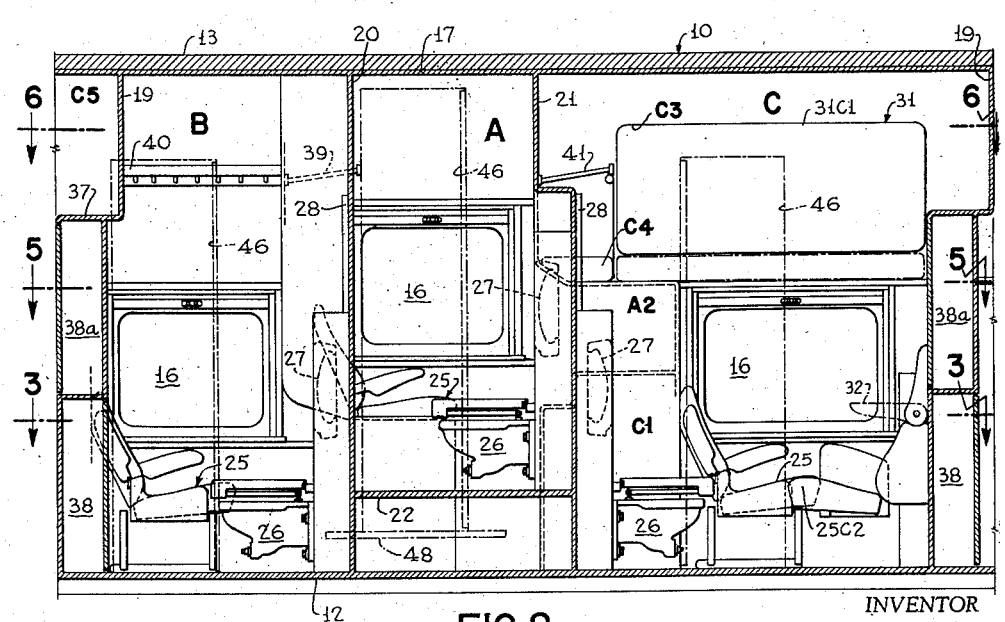
Fig. 2 is a vertical longitudinal section taken on the line 2—2 of Figs. 3, 4, 5 and 6.
Figure 3:
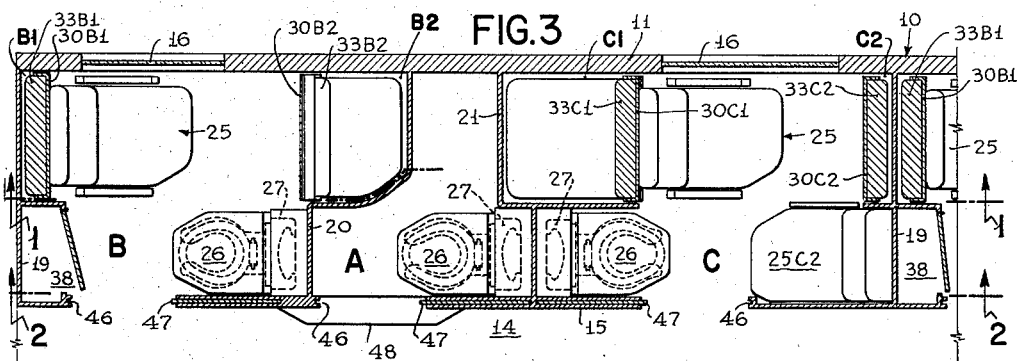
Fig. 3 is a horizontal section and plan view taken on the line 3—3 of Figs. 1 and 2, the parts being shown in position for day use.
Figure 4:
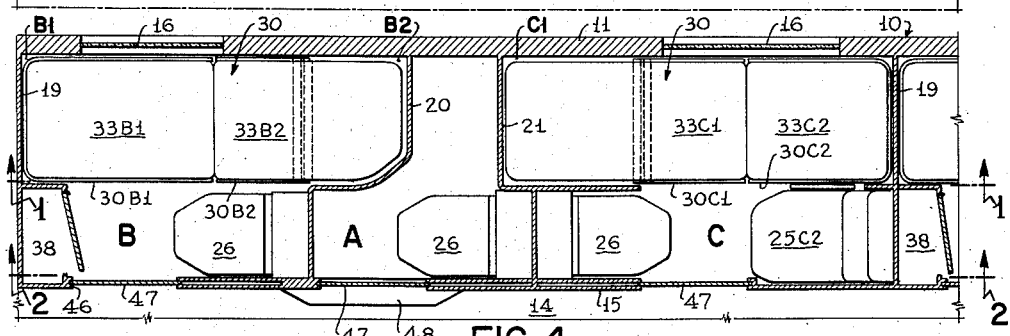
Fig. 4 is a view like Fig. 3 but showing the parts in position for night use.
Figure 5:
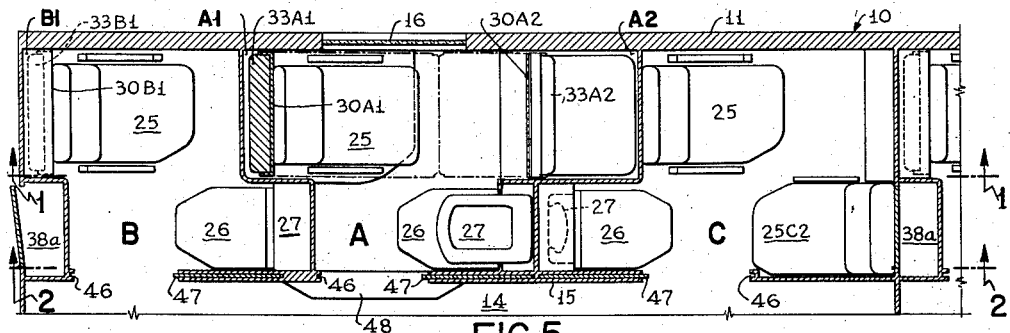
Fig. 5 is a horizontal section and plan view taken on the line 5—5 of Figs. 1 and 2.
Figure 6:
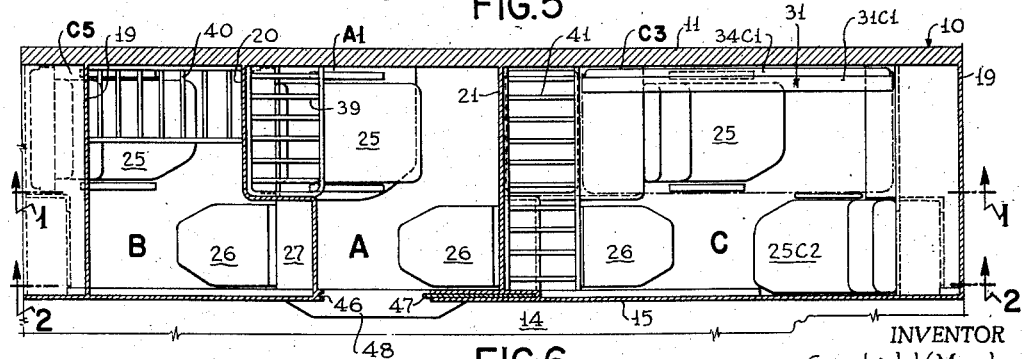
Fig. 6 is a horizontal section and plan view taken on the line 6—6 of Figs. 1 and 2.
Figure 8:
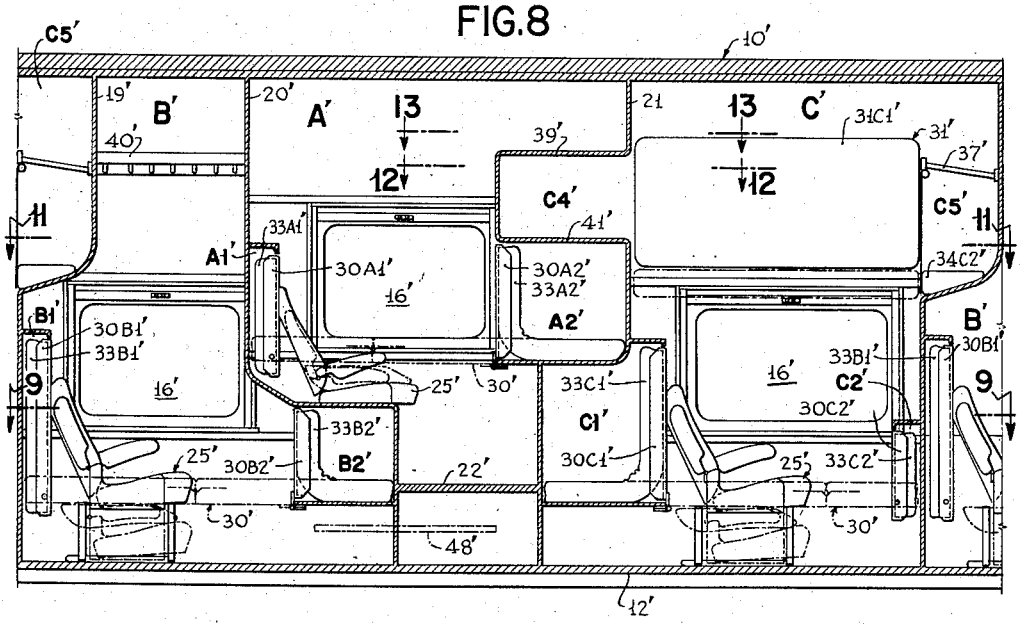
Fig. 8 is a vertical longitudinal section taken on the line 8—8 of Figs. 9, 10, 11, 12 and 13.
Figure 7:
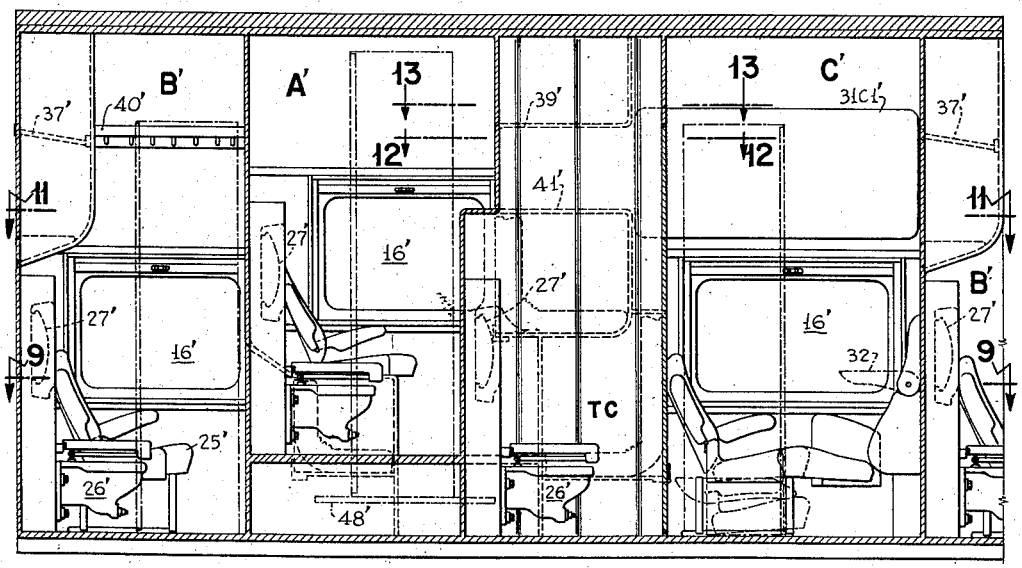
Fig. 7 is a vertical longitudinal section through a car equipped with a modified form of the present accommodations, the section being taken on the line 7—7 of Figs. 9, 10, 11, 12 and 13.
Figure 9:
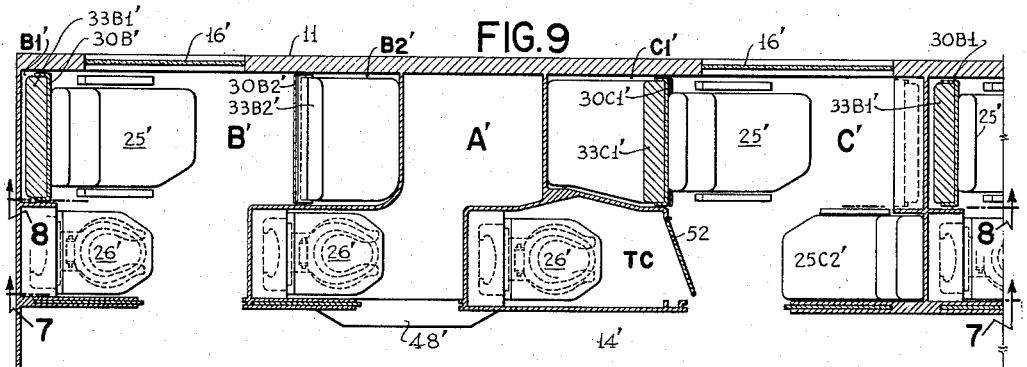
Fig. 9 is a horizontal section and plan view taken on the line 9—9 of Figs. 7 and 8.
Figure 10:
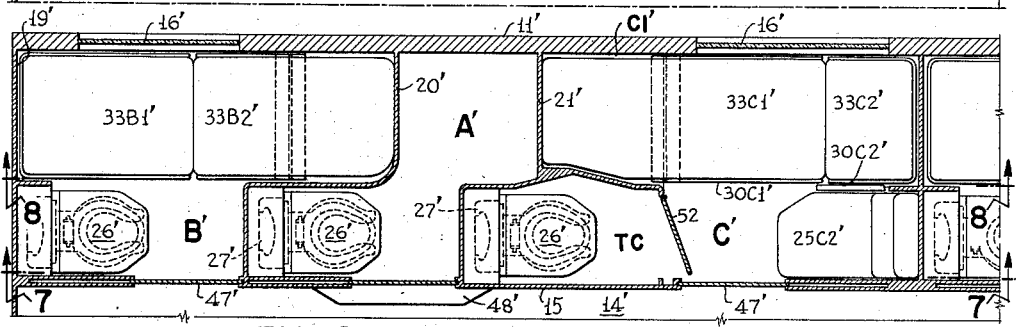
Fig. 10 is a view like Fig. 9 but showing the parts in position for night use.
Figure 11:
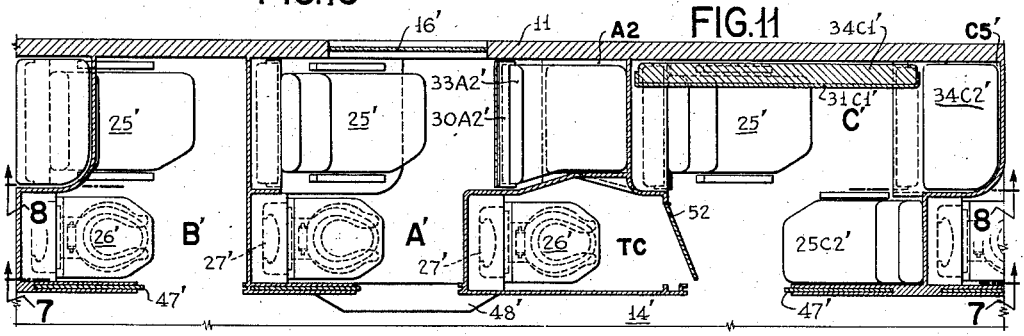
Fig. 11 is a horizontal section and plan view taken on the line 11—11 of Figs. 7 and 8.
Figure 12:
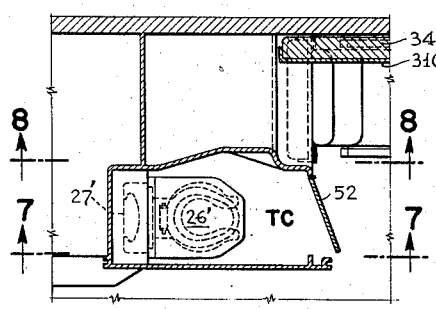
Fig. 12 is a horizontal section and plan view taken on the line 12—12 of Figs. 7 and 8.
Figure 13:
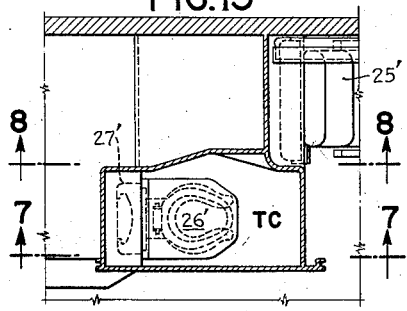
Fig. 13 is a horizontal section and plan view taken on the line 13—13 of Figs. 7 and 8.
Figure 14:
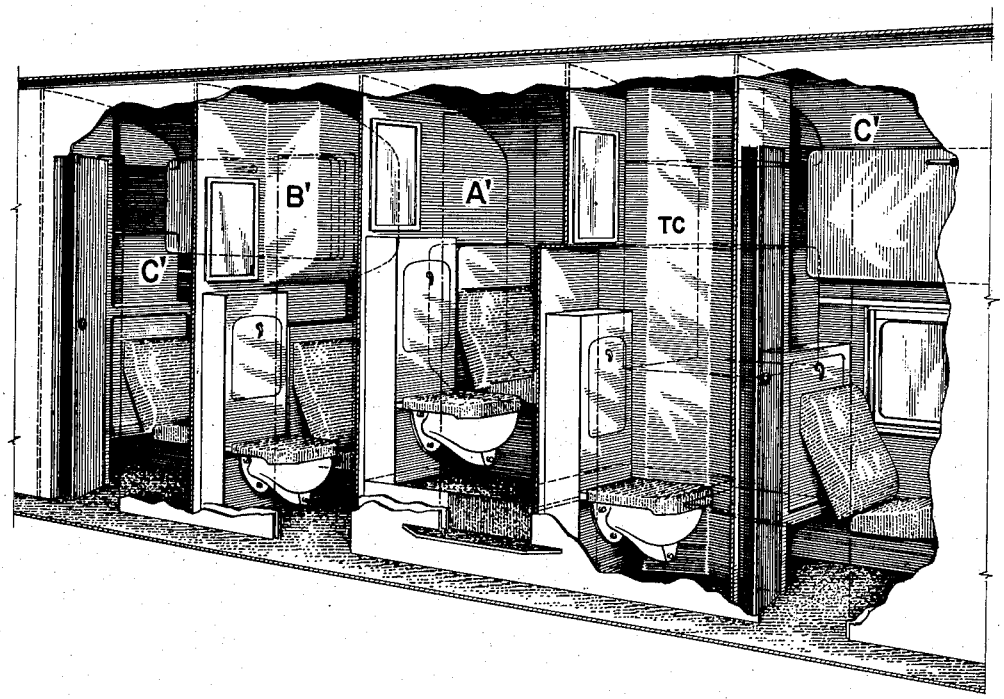
Fig. 14 is a vertical perspective view of the parts shown in Fig. 7.
Figure 15:
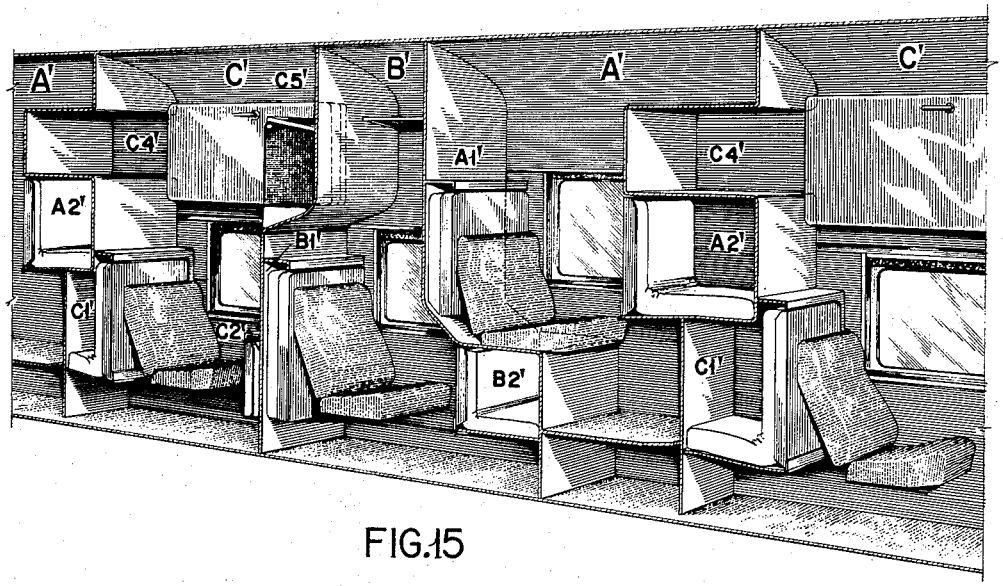
Fig. 15 is a vertical perspective view of the parts shown in Fig. 8.
Figure 16:
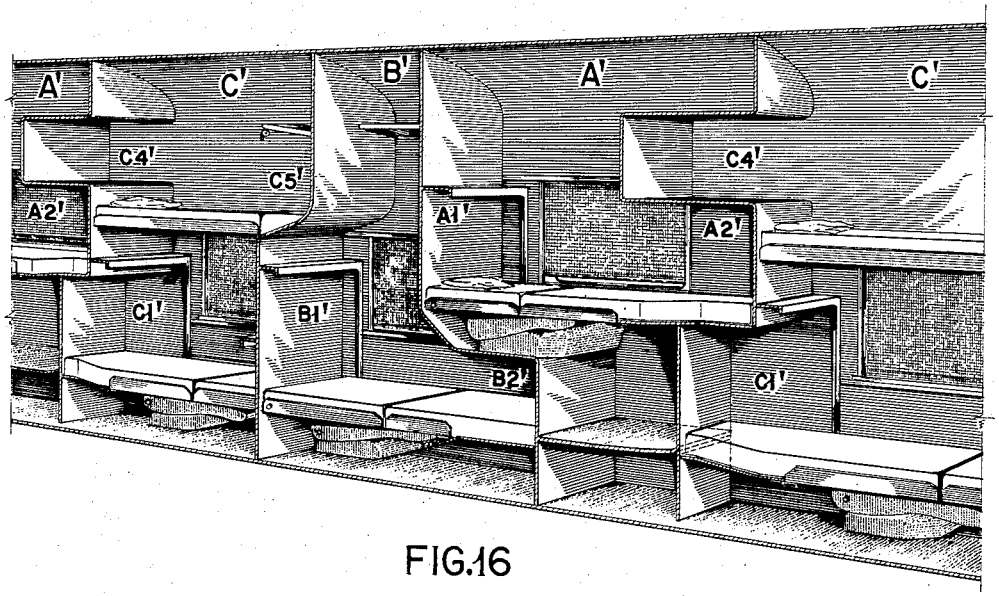
Fig. 16 is a perspective view like Fig. 15 but showing the parts in night position.

The space in room B between the seat and the aisle wall in front of the lower part of partition 19 may be used to accommodate a wardrobe or locker 38 for compartment B. As shown in Fig. 2, the wardrobe 38 does not extend the full height of the offset, as it might, but is made shorter and the space above it is used for a short wardrobe 38a for compartment C. If desired, there may be additional folding steps mounted on the aisle wall, as well as hand grip loops to aid in using the upper bed.

The wall 20 between room A and room B is reversely offset vertically at the outer side to form the alcoves A1 and B2 and on the aisle side is offset horizontally relative to alcove A1 to take the toilet, basin and mirror unit of room B. The wall may be continued upward on the line of the back of the offset of alcove A1 to provide space for a baggage rack 39 for room A.

Room B may be provided with a baggage rack 40 over the window and between the projections or boots of the alcoves A1 and C5.

The wall 21 between room A and room C is offset for the bed alcove C4 and below this in the bed zone is reversely offset for the bed alcove A2 and below this is again reversely offset for the bed alcove C1. On the aisle side the wall is provided with a transverse portion between the toilet facility assemblies for rooms A and C. Above the height needed for foot room in the alcove C4 a baggage rack 41 is provided and in room C above the toilet facility assembly for room C this rack 41 may be continued to the aisle wall. A roll curtain 44 may be provided to close off the alcove C4 and protect the bedding therein; the bag rack being made solid instead of slotted to form a cover, if desired.

The bed parts in front of the window seats in rooms B and C may be opened out to form comfortable leg rests. The bed level in room A is too high for the part in front of the seat to form a leg rest but here a hinged leg rest 42 is provided, the rest being swung up and latched to the hinged bed part when the bed part is in stowed position. When the bed part is swung down it will carry the leg rest down with it.

Each compartment is provided with an aisle doorway 46 closed by a sliding door 47. Steps 48 are provided for the upper compartment A.

The bed parts in the lowered or use position are held up by struts and wall brackets at the outer ends as in the prior application.

As an indication as to how infants' hammocks 50 can be mounted in the compartments these are shown in outline in rooms B and C. Here it is seen that the hammocks do not interfere with the use of the seats or with the use or manipulation of the beds. A hammock could also be mounted in the A room by hanging it after the bed has been lowered. The upper bed could be used for an infant if it was not otherwise needed. In any of the rooms the lower or foot-end bed part can be opened for temporary use for an infant if desired. In all cases there is room to make the head-end bed parts longer so the foot-end bed parts may be shorter to clear the legs when a passenger is sitting in the seat and the foot-end bed part is lowered and used for an infant.

The second embodiment (Figs. 7–16) is in most respects like the first but has been modified to provide a toilet enclosure for the C room.

The parts in the second embodiment which correspond to those of the first embodiment are designated by the same reference characters but with a prime (') added. These need not be described again.

The appointments of room B' are much the same as those of room B except that the toilet 26' and wash basin 27' are arranged alongside the seat 25'.

Room A' also has the toilet 26' and wash basin 27' located alongside the seat. Splash guards may be provided between the seats and toilets, as in the prior application if desired. The foot-end bed space A2' is tapered and the baggage rack 39' above the bed alcove near the ceiling is used for room A.

Room C' has the greatest changes. The head-end alcove C1' is tapered at the end and a toilet enclosure TC is provided alongside the tapered alcoves A2' and C1'. The taper of these alcoves gives wide body space in the toilet enclosure adjacent the front of the toilet where it is needed for standing. A door 52 is provided for the toilet enclosure. Since the nominal head-end alcove C1' is deep and tapered in this embodiment the other end C2' may serve as the head end for sleeping. The upper bed 31', instead of being directly over the lower bed for its full length, as in the other case, extends forward at its foot alcove C5' and has a baggage rack 37' thereover. Room C' has another baggage rack 41' at the head end within the alcove C4' and beneath the baggage rack 39' of room A. The rack 39' of room A may extend for the full width between the aisle and side walls.

There is no enclosed wardrobe in the second form. There is space in all of the rooms for an infant's hammock. Bed parts provide infant's day accommodations or leg rests in the B' and C' rooms; there is no space for a leg rest in the A' room.

It is thus seen that the invention provides comfortable, convenient, economical, and high-capacity compartment accommodations for vehicles. In all rooms there is a comfortable chair; in all cases it faces in a common direction with others; and in all cases it is disposed at an outside wall window. Each room has its own toilet and basin, all on the aisle-wall side. Each room has a bed or beds at the outside wall. Each room has at least one bed which is formed of two parts, one or both of which are foldable into an alcove. Each room has ample bag-rack space. Each room has a large window at a convenient height. In most forms each room has leg rest means, and each room will accommodate an infant's hammock at a level which is convenient to the occupant of the main bed.

While certain embodiments of the invention have been described for purposes of illustration, it is to be understood that there may be other embodiments within the general scope of the invention.

What is claimed is:

1. In a passenger carrying vehicle, in combination, a longitudinally extending outer side wall, a longitudinally extending aisle wall, a plurality of longitudinally spaced transverse partition walls dividing the space between said side wall and said aisle wall into a plurality of passenger occupancy compartments, arranged in a unit group of three compartments, each compartment being of approximately double sitting width and the length of the unit group of three compartments being considerably less than three times a single reclining or sleeping length, each compartment having an aisle door, a seat, and longitudinal full-length bed accommodations in a vertical bed zone at the outer wall side, the bed accommodations being approximately half the width of the compartment and leaving standing and sitting width space between the bed accommodations and the aisle wall, at least two of the three compartments of a unit having floors at aisle floor level, the intermediate transverse walls of a unit being offset longitudinally at spaced levels in the vertical longitudinal bed accommodation zone to provide oppositely projecting alcoves with floors of bed-accommodation width for receiving part of the length of the bed accommodations of adjacent compartments in overlapping relationship, the beds being arranged in three levels in a unit, and at least one of said intermediate transverse walls being formed with three vertically spaced alcoves to provide alcove space for bed accommodations at the three bed levels, bed parts supported on the floors of all of said alcoves of the intermediate transverse walls, and folding bed parts in each of said compartments mounted in proper position on other walls of the compartments to form when folded down with the bed parts in said alcoves full-length bed accommodations supported at levels even with said alcove floor levels.

2. A group unit compartment arrangement as set forth in claim 1, further characterized by the fact that a bed accommodation in each compartment is located at one of the two lower levels of said three levels, that two of the compartments each has a bed accommodation at the lowest level, and that one of the compartments with a bed accommodation at the lowest level also has a bed accommodation at the highest level.

3. A group unit compartment arrangement as set forth in claim 1, further characterized by the fact that the compartment which has a bed accommodation at the highest level also has a bed accommodation at the lowest level, the bed accommodations of said compartment having parts in vertically spaced alcoves formed in a transverse wall which are separated by an intermediate alcove formed in the same transverse walls which opens in a direction opposite to that of the said spaced alcoves of the two-bed accommodation compartment to receive a bed part of an adjacent compartment.

4. A group unit compartment arrangement as set forth in claim 1, further characterized by the fact that the two end compartments have each a bed accommodation at the lowest alcove floor level, that the intermediate compartment has a raised compartment floor level and a bed accommodation at the intermediate alcove floor level, and that one of said compartments has another bed accommodation at the highest alcove floor level.

5. A group unit compartment arrangement as set forth in claim 4, further characterized by the fact that one end compartment has the bed accommodation at the highest alcove floor level.

6. A group unit compartment arrangement as set forth in claim 1, further characterized by the fact that one of said compartments is provided with two bed accommodations at different alcove floor levels, the bed accommodation at the higher level in the two-bed accommodation compartment having a supporting bed part movable from a horizontal use position to a stowed position about a longitudinally directed horizontal side along the outer wall and ceiling.

7. A group unit compartment arrangement as set forth in claim 1, further characterized by the fact that each of said compartments is provided on the aisle side with a longitudinally directed toilet and that one of said compartments is provided with an elongated aisle wall portion on one side of the door alongside a toilet, and enclosure means forming, with said elongated aisle wall portion and an adjacent transverse wall, a toilet enclosure with a door located in front of the toilet.

8. A group unit compartment arrangement as set forth in claim 1, further characterized by the fact that each end compartment has a bed part at each of its opposite transverse walls hinged at its lower end to turn about a horizontal axis from a vertical stowed position at a wall to a horizontal use position even with the alcove floor of an intermediate transverse wall, that the intermediate compartment has a bed part at each of its opposite transverse walls hinged at its lower end to turn about a horizontal axis from a vertical stowed position at a wall to a horizontal use position even with the alcove floor at one of said walls, and that one of said end compartments has a bed part hinged at a lower longitudinal edge to turn about a horizontal axis from an upper stowed position at said outer wall to a horizontal use position even with the alcove floor of an intermediate transverse wall.

References Cited in the file of this patent

UNITED STATES PATENTS 2,309,665   Parke                     Feb. 2, 1943
2,323,620   Parke et al.              July 6, 1943

(Other references on following page)

UNITED STATES PATENTS

| | | |
|---|---|---|
| 2,364,595 | Tully et al. | Dec. 5, 1944 |
| 2,478,402 | Jones | Aug. 9, 1949 |
| 2,528,307 | Heaney | Oct. 31, 1950 |
| 2,531,687 | Jones | Nov. 28, 1950 |
| 2,567,894 | Reinke et al. | Sept. 11, 1951 |
| 2,570,837 | Murphy et al. | Oct. 9, 1951 |
| 2,583,960 | Murphy | Jan. 29, 1952 |
| 2,599,606 | Burgess | June 10, 1952 |
| 2,724,347 | Watter | Nov. 22, 1955 |
| 2,743,683 | Calhoun | May 1, 1956 |
| 2,808,787 | Murphy | Oct. 8, 1957 |